March 4, 1969 STEN-ÅKE BERGSTRAND 3,431,083
TUBULAR CATALYTIC REACTOR INCLUDING HEATING
AND COOLING MEANS WITHIN THE REACTOR
Filed Sept. 22, 1964 Sheet 1 of 3
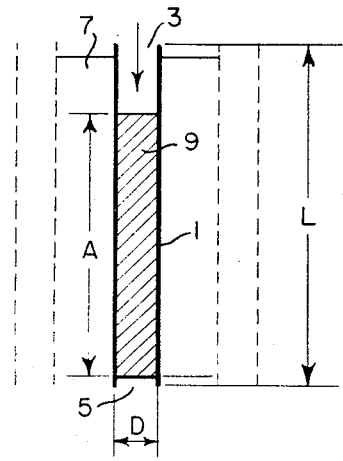
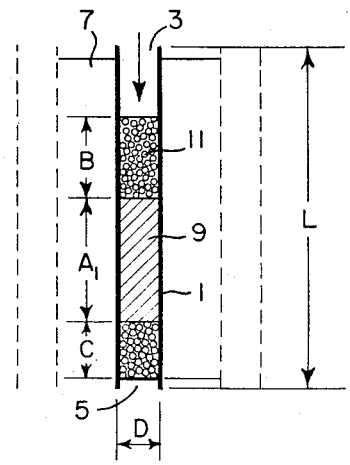
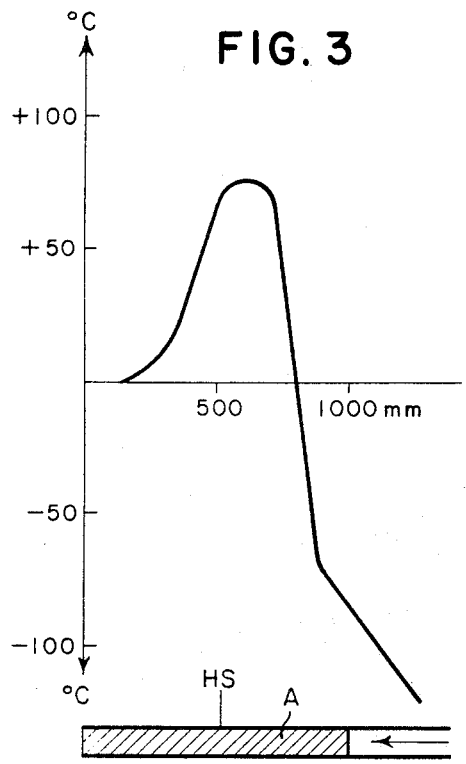
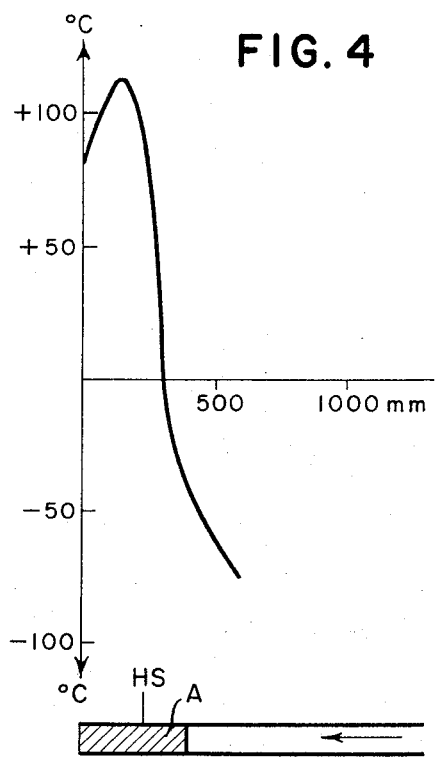
INVENTOR
Sten-Åke Bergstrand
BY Stevens, Davis, Miller & Mosher
ATTORNEYS

United States Patent Office 3,431,083
Patented Mar. 4, 1969

3,431,083
TUBULAR CATALYTIC REACTOR INCLUDING
HEATING AND COOLING MEANS WITHIN
THE REACTOR
Sten-Åke Bergstrand, Ingenjorsvagen, Perstorp, Sweden,
assignor to Perstorp Aktiebolag, Perstorp, Sweden
Filed Sept. 22, 1964, Ser. No. 398,313
Claims priority, application Sweden, Sept. 23, 1963,
10,342/63
U.S. Cl. 23—288                    4 Claims
Int. Cl. B01j 9/00; C07c 47/04

ABSTRACT OF THE DISCLOSURE

A multi-tubular reactor for the oxidation of methanol in the production of formaldehyde having a first or preheating section, a second section having catalyst bodies within the tubes and a third or cooling section, all the sections being surrounded by a body of heat transfer liquid, the first and the third sections of the tubes having solid inert material therein to increase heat transfer between the gases flowing through the tubes and the surrounding liquid. For space velocities in the order of 5–20 m.$^3$ gas per liter of catalyst volume per hour, the lengths of the sections would be: preheating section about 200–700 mm., catalyst section about 150–1000 mm., and cooling section about 200–600 mm.

General description of the invention

Figure 5:
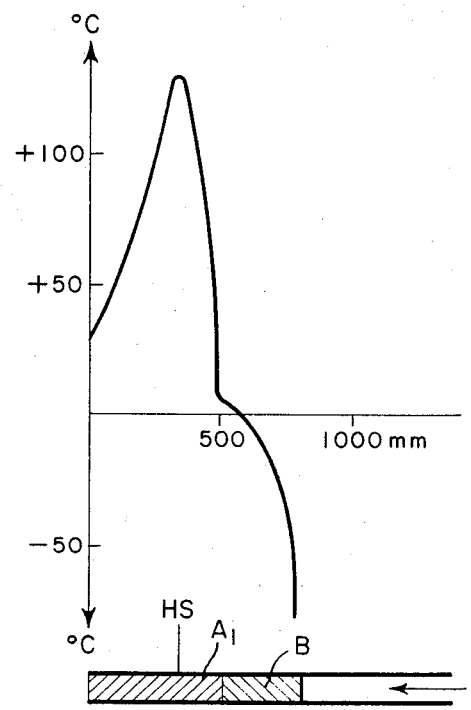

The present invention concerns a device for producing formaldehyde by oxidation of methanol by means of an apparatus including a number of tubes, in which a catalyst has been placed. This catalyst is flowed through by the gases, which are to react with each other. It is known in connection with such reactors to surround the tubes with a heat transferring medium for better control of the reaction temperature and its variations during the passage of the gases through the tubes. Suitable heat transferring mediums comprise thermostat oils or salt melts.

In such reactors it has been the usual practice to provide a relative large mass of the catalyst in the tubes for controlling the reaction and for obtaining a final product as pure as possible. When the process concerns oxidation of methanol to formaldehyde a silver catalyst or a catalyst based on metal oxides, e.g. molybdenum oxide-iron oxide, may be used. The following description is directed to tubular reactors for such a reaction and appropriate catalysts, e.g. molybdenum oxide-iron oxide is used.

It has been shown through measurements that only a short section of the catalyst mass in the tubes is active as a real catalyst. In this section the temperature of the flowing gas mixture rises as the oxidation occurs. Before this active section the catalyst mass serves only as a heat exchanger between the heat transferring medium, which surrounds the tubes, and the gas mixture. The catalyst mass below said active section acts in the same way as a heat exchanger between the heat transferring medium and the reaction gas mixture in the tubes. It has namely been shown that it is desirable to give the reaction gases after the oxidation the same temperature as the heat transferring medium surrounding the tubes as far as it is possible. This heat transferring medium serves accordingly two functions, viz. partly heating the gas mixture before the catalytic oxidation commences and partly cooling the reaction gas mixture after the oxidation.

It has further been shown that the active part of the catalyst in the tube is successively impaired regarding its catalytic activity on account of erosion and other circumstances, which causes said active section to be displaced downwards in the tube. By protracted work the active part of the catalyst will therefore be constituted of the lowermost part of the catalyst mass. This leads to the fact that no catalyst mass remains for cooling the reaction gas mixture after the oxidation reaction, the reaction gas mixture is instead flowing out from the tubes in a very hot condition, which is a great disadvantage on account of the risk for occurring a plurality undesirable contaminations.

A certain change of the catalyst mass can be observed during protracted work, which can be seen as successively increasing of the pressure fall in the tubes and in connection therewith a lower capacity, if not the pressure of the incoming gas mixture in the tubes is successively increased in correspondence to the pressure fall. Such an increase of the gas pressure is however both difficult and expensive to perform, though it usually becomes necessary, because if not the gas speed through the catalyst mass (space velocity) will be so low that undesired by-reactions occur to a substantial extent.

A general aim of the present invention is to improve a catalyst device of the above-mentioned type for eliminating the indicated disadvantages.

According to the present invention a device for carrying out chemical reactions by means of a catalyst mass placed in tubes is characterized in that the tubes besides the catalyst mass itself contain chemically inactive bodies, which are adapted to bring about the desired heating and/or cooling of the gases, which pass through the tubes.

These bodies consist preferably of conventional ceramic tower packing materials, such as ceramic balls or rings, glass pearls, glass wool or equal inert material. This material can be applied separately above and/or below the real catalyst mass in the tubes. In this case an improved heat transfer between the medium surrounding the tubes and the gas mixture flowing through the tubes is brought about by said material. However, the desired activity may sometimes be reached by admixing inert bodies of suitable kind to the catalyst mass.

To explain the invention more in detail we suppose that two sections of inert material have been placed in each tube, one section upstream and one section downstream that section in which the catalyst mass itself has been introduced. According to the invention the upstream sections should be fixed in length and compositions that the gas mixture flowing into the tubes during the passage through the upper section of inert material is heated to a temperature being suitable for the entrance into the central catalyst section. In the same way the downstream section of inert material shall be adapted regarding its length and composition to bring about a sufficient cooling of the reaction gases.

When a device according to the present invention is working, the catalyst will be much more effectively made use of than by the earlier known devices, and at the same time certain other substantial advantages are obtained. On account of the fact that the temperature already at the entrance in the catalyst section has been given the desired value, the catalytic reaction is immediately started, that means that even the uppermost part of the catalyst mass becomes catalytically active. As the device is maintained in work, the catalyst mass will be consumed for reasons mentioned above, whereby the zone in which catalytic reactions are occurring will be displaced downwards in the tube, so that it finally reaches the bottom part of the catalyst section. During all the time, even in the last mentioned stage, the section of inert material disposed below the catalyst section will bring about the necessary cooling of the reaction gases, so that these after the outlet of the tubes do not give rise to undesired reactions. It is evident that all the catalyst mass is effectively made use of by the device according to the present invention as no part thereof has to serve only for heat transferring purposes. Another advantage with the invention is that said sections with inert material do not undergo any erosion or other destroying, which can lead to increased pressure fall in the tubes. The sections with inert material can in itself be made more pervious for the gas mixture than the catalyst mass itself without giving lower effect regarding the heat exchanging. According to the invention there will be obtained partly lower initial pressure fall in the tubes, partly lower increase of pressure fall. In connection herewith the co-action may be mentioned that the gas velocity through the tubes can easier be maintained at a sufficient value by the device according to the invention than by the earlier known devices on account of said lower values of the pressure fall resp. pressure fall increase.

Detailed description of the invention

Figure 6:
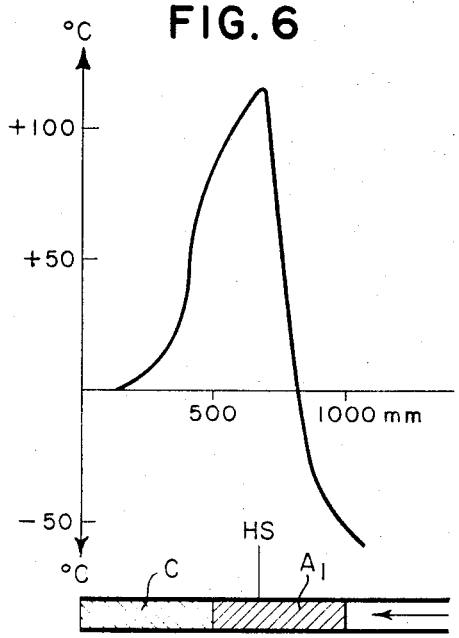
Figure 7:
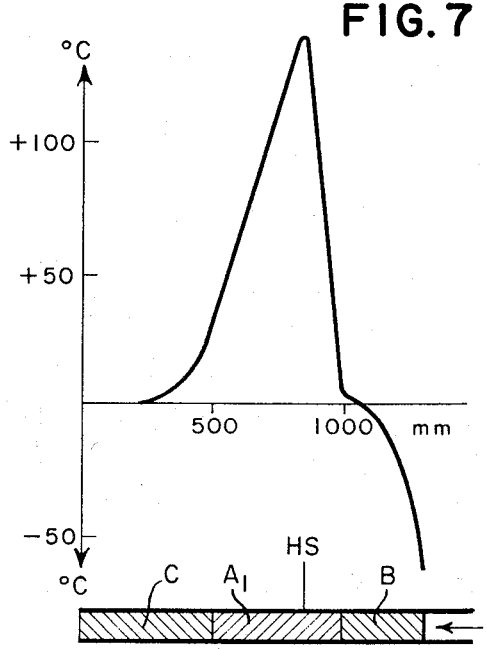
Figure 8:
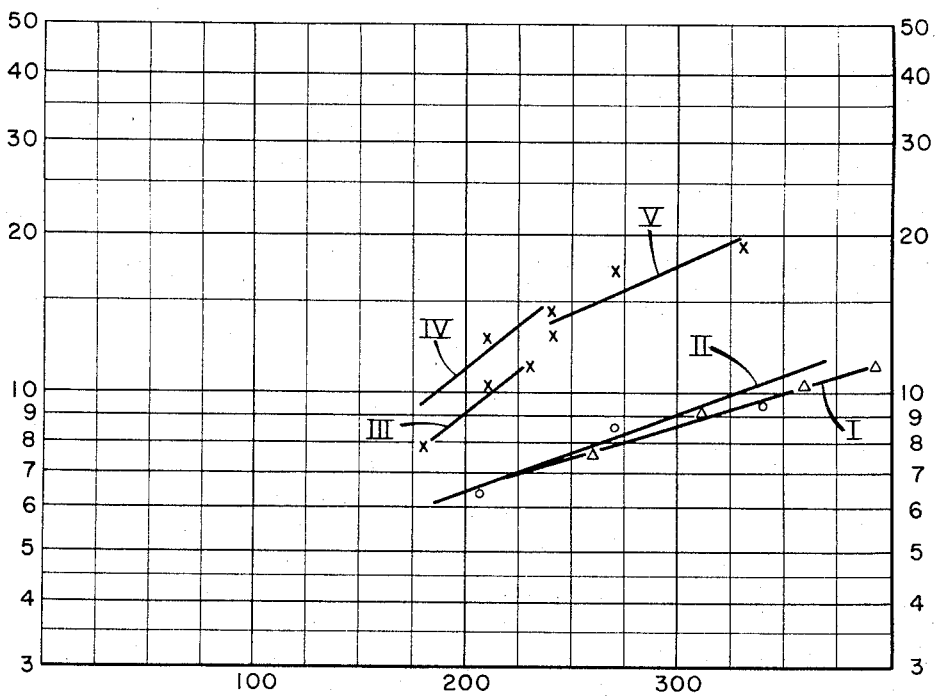

The invention will be more fully described in the following in connection with the attached drawings, in which FIG. 1 shows a catalyst tube having surrounding heat transferring medium in connection with a known device for oxidation of methanol to formaldehyde. FIG. 2 shows a corresponding part in connection with one embodiment of the present invention. FIGS. 3–7 show five curves of the temperature in the tubes in known devices (FIGS. 3 and 4) and in three different embodiments of the invention (FIGS. 5–7). FIG. 8 shows some more explaining curves.

In FIG. 1, which shows one of the tubes included in the reactor for oxidation of methanol to formaldehyde, which tube contains catalyst mass, the tube itself is designated by 1 and the inlet and outlet of the tube are designated 3 and 5 respectively. The tube is surrounded by a heat transferring liquid 7. The catalyst mass in the tube 1 is designated by 9. The diameter of the tube is characterized by D and its length by L, while the catalyst takes a length of A.

A methanol-air mixture is passed through the tubes 1, the methanol being oxidized to formaldehyde by the action of the catalyst 9. Before the catalytic action commences, the gas mixture must have reached a certain temperature. The increase in temperature is brought about by the passage of the gas mixture through an upper part of the catalyst. This part will accordingly not act as a catalyst but primarily only as a heat exchanger. When the reaction commences, the temperature of the gas mixture rises on account of the heat evolved and reaches a peak a distance lower down in the tube. The point for the highest temperature, the so-called hot spot, and the temperature value are recorded for requisite control of the reaction. After said hot spot the oxidation is substantially finished, and the reaction gases will therefore be cooled by the continued passage through the tubes. It is desirable that the cooling is so effective that the gases streaming out of the tubes substantially correspond to the temperature of the heat transferring medium 7.

As the reactor is maintained in work, the active part of the catalyst will gradually be consumed on account of the erosion and for other reasons. The position for said hot spot will therefore successively be displaced downwards in the tubes and reaches finally a position, where the following catalyst section becomes too short to bring about the requisite cooling of the reaction gases. It will therefore often be necessary to interrupt the work and to replace the catalyst mass in the tubes before the old mass is completely consumed.

In FIG. 2 one embodiment of the device according to the invention is schematically shown. In the inlet end of the catalyst tube upstream of the catalyst section a gas-pervious, inert material 11, e.g. ceramic rings or glass balls, taking a length B of the tube is arranged. A middle part having the length A1 is taken up by catalyst mass. The outlet end of the tube downstream of the catalyst section is even taken up by inert material to a length of C.

In FIGS. 3–7 curves regarding the temperature conditions at different fillings of the catalyst tubes are shown. The length along the catalyst tube has been plotted along the abscissa, while the temperature aberrations from the temperature of the surrounding heating medium have been plotted along the ordinate. A tube has schematically been indicated below the diagram, the arrow showing the flowing direction of the methanol-air mixture. The letters HS indicate the position for the highest temperature in the tube, the so-called hot spot. FIGS. 3 and 4 refer to the case when the tubes contain only catalyst mass. As will be apparent from these figures an appreciable length, about 200 mm. of the catalyst mass, serves substantially as a heat exchanger for the methanol-air mixture and raises its temperature to the temperature of the surrounding heating medium. Thereafter the catalytic, exothermic reaction causes a temperature increase up to the mentioned hot spot, whereupon the rest of the catalyst mass serves as a heat exchanger for the cooling. In FIG. 3 the remaining length of the catalyst after hot spot is sufficient for lowering the temperature to the temperature of the surrounding heating medium. According to FIG. 4, which refers to a case, when the catalyst mass occupies a shorter distance of the tube than according to FIG. 3, the hot spot mentioned above is lying so close to the outlet of the tube that the remaining part of the catalyst after the hot spot is unable to cool the reaction gases to the temperature of the heating medium, and the reaction gases will be about 80° C. warmer than the heating medium at the outlet. As pointed out above this is a substantial disadvantage, because undesired by-products may arise at these high temperatures. Similar conditions as those according to FIG. 4 occur also after working a long time in the case according to FIG. 3, as said hot spot will successively be displaced toward the outlet of the tube, because the catalyst is consumed as pointed out above.

By the device according to FIG. 2 a better function is obtained by inserting the sections B and C of inert material according to the invention.

The action of section B of inert material is illustrated in FIG. 5, which refers to a case, in which the catalyst mass occupies the rest of the tube. As is evident the section B acts as a heat exchanger and raises the temperature of the methanol-air mixture to the temperature of the surrounding heat transferring medium. The catalytic action commences immediately thereafter, so that even the very first part of the catalyst mass takes part therein. On account of this the position for said hot spot will lie close to the starting end of the catalyst, about 150 mm. therefrom. The rest of the catalyst acts as a heat exchanger until the catalyst mass is consumed.

In FIG. 6 the conditions in the case, when only sections A1 and C are present, are shown. As will be seen, the temperature of the methanol-air mixture is insufficient, when the mixture reaches the catalyst A1. The first part of the catalyst mass, approx. 200 mm., will therefore act as a heat exchanger for increasing the gas temperature to the temperature of the heat transferring medium 7. The position for said hot spot will therefore lie very far from the upper end of the catalyst, viz. approx. 350 mm. The section C of glass pearls acts as a heat exchanger and lowers the gas temperature to the temperature of the heat transferring medium.

By adequately choosing the length of the sections A1, B and C it is possible to obtain partly that said hot spot by working with a new catalyst mass lies so close to the starting end of the catalyst as possible, and partly that requisite cooling of the reaction gases is brought about even in that case, when said hot spot by consumed catalyst mass lies very close to the end of the catalyst. Said lengths A1, B and C are dependent on the space velocity value in the different sections, the dimensions of the catalyst tubes used and the reaction, which is to be performed.

In general, for space velocities in the order of 5–20 mm. per liter of catalyst volume per hour, the lengths of the sections would be: A1, 150–1000 mm.; B, 200–700 mm.; and C, 200–600 mm. Preferably, the space velocity is about 8–12, and the length A1 about 300–750 mm., and B and C are at least 400 mm. and at least 300 mm. respectively.

FIG. 7 shows a case, in which the first section B of inert material is so adapted that it raises the temperature of the methanol-air mixture to the temperature of the surrounding medium, while the end section C of inert material is adapted to give requisite cooling of the reaction gases after the catalytic reaction, so that the temperature decreases down to the temperature of the heating medium.

FIG. 8 shows a few curves referring to the dependence of the hot spot position on the space velocity value of the catalyst. The position of the hot spot measured in mm. from the starting end of the catalyst has been plotted along the abscissa and the space velocity value measured in m.$^3$ gas per litre catalyst and hour has been plotted along the ordinate. The curve having the indication I refers to a case, when the length of the section B=0 that means when no inert filling is present in the section. The curve having the indication II refers to the same section having a filling of 300 mm. inert material in the section B, and the curves III, IV and V are for sections having filling heights of 400, 500 and 600 mm. respectively.

As will be seen from the diagrams the hot spot position lies closer to the starting end of the catalyst the lower the space velocity value is, and an increased filling with inert material in the section B causes an increase of the space velocity value at unchanged position of said hot spot, which leads to a higher effect of the reactor.

A too small filling height of inert material in the section B does not appear to have any influence at least not at space velocity values larger than 6. The diagrams show also that a filling height of about 500 mm. is sufficient up to space velocity values of approx. 14 and that a higher filling height allows still larger space velocity values, so that the catalyst can be loaded heavier by unchanged pressure fall, which cannot be attained with only the catalyst in the tube. The following Table 1 shows the effect of the height of the inert material in section C on the outlet temperature of the reaction gases at different values of the space velocity for a given height of catalyst.

TABLE 1

| Filling height of section C | Space velocity in the inert material | Temp. in ° C. above the temp. of the heating medium | |
|---|---|---|---|
| | | After the catalyst | After section C |
| 300 | 12.7 | 68 | 0 |
| 300 | 16.9 | 90 | 2 |
| 300 | 18.8 | 99 | 2 |
| 400 | 9.5 | 79 | 0 |
| 400 | 12.8 | 83 | 1 |
| 400 | 14.1 | 100 | 4 |
| 500 | 7.6 | 90 | 0 |
| 500 | 10.2 | 100 | 3 |
| 500 | 11.3 | >100 | 4 |

Table 2 shows the effect of the inert material in section C on the temperature of the outgoing reaction gas at varying space velocity values of the inert material, when the length of section C is sufficient (500 mm.). As is apparent from the table the outgoing reaction gas has reached the ideal temperature that means the temperature of the surrounding heating medium, if the filling height is sufficient, within a very large loading range, viz. for space velocity values between 5–30. This means also that even the section C assists in enhanced possibilities for rising the space velocity in the catalyst at unchanged pressure fall compared to the conditions in a conventional device, in which the tube filling consists only of the catalyst mass.

TABLE 2

| Filling height of section C | Space velocity in the inert material | Temp. in ° C above the temp. of the heating medium | |
|---|---|---|---|
| | | After the catalyst | After section C |
| 500 | 5.3 | 38 | 0 |
| 500 | 7.1 | 41 | 0 |
| 500 | 7.6 | 90 | 0 |
| 500 | 7.9 | 56 | 0 |
| 500 | 10.2 | 100 | 3 |
| 500 | 21.0 | >200 | 0 |
| 500 | 28.3 | >150 | 0 |

The invention is not limited to the described and shown embodiment examples, as these can be modified in different ways within the scope of the invention.

I claim:
1. A reactor for manufacturing formaldehyde by oxidation of methanol comprising a tube surrounded by a heat-transfer medium, a central section of said tube containing a catalyst for said reactor, and an upstream and a downstream section of said tube relative to said catalyst section and containing solid inert bodies, the upstream section having a sufficient length for heating the feed mixture passing through the tube to substantially the temperature of the heat-transfer medium during its passage through said upstream section, and the downstream section having a sufficient length to cool the reaction mixture leaving said central section to substantially the temperature of the heat-transfer medium.

2. Apparatus according to claim 1 in which the solid inert bodies are of ceramic tower packing materials.

3. Apparatus according to claim 1, wherein the length of the central section is about 150–1000 mm., the length of the upstream section is 200–700 mm. and the length of the downstream section is 200–600 mm.

4. Apparatus according to claim 1, wherein the length of the central section is 300–750 mm., the length of the upstream section is at least 400 mm. and the length of the downstream section is at least 300 mm.

References Cited

UNITED STATES PATENTS 2,248,734   7/1941   Barr _____ 23—288.9
2,452,569   11/1948   Houdry.
2,742,347   4/1956   Carlson _____ 23—288
3,147,084   9/1964   Franzen et al. _____ 23—288.92
3,361,822   1/1968   Schmitt et al. _____ 23—288 XR MORRIS O. WOLK, *Primary Examiner.*

BARRY S. RICHMAN, *Assistant Examiner.*

U.S. Cl. X.R.

260—606